United States Patent Office 2,719,162
Patented Sept. 27, 1955

2,719,162

5 - (3 - HYDROXYBENZYLIDENE) - 3 - PHENYL - 2 - PHENYLIMINO-4-THIAZOLIDONE AND PROCESS

George W. Sawdey and James A. Van Allan, Rochester, N. Y., assignors to Eastman Kodak Company, Rochester, N. Y., a corporation of New Jersey No Drawing. Application March 29, 1954, Serial No. 419,581

4 Claims. (Cl. 260—306.7)

This invention relates to 5-[3-(2,4-ditertiaryamylphenoxyacetoxy)benzylidene] - 3 - phenyl-2-phenylimino-4-thiazolidone and a method for making the same.

Certain thiazolidone compounds containing a 3-benzylidene group have long been known. Certain of these thiazolidones are useful as ultraviolet filtering agents, e. g. in layers of photographic elements. (See, for example, Sawdey U. S. application Serial No. 317,864, filed October 31, 1952).

We have now found that 5-[3-2,4-ditertiaryamylphenoxyacetoxy)benzylidene] - 3 - phenyl - 2 - phenylimino - 4-thiazolidone also is useful as an ultraviolet absorbing agent, its efficiency and stability to light being many times that of the known 3-benzylidene-4-thiazolidones.

It is, accordingly, an object of our invention to provide a new thiazolidone compound. Another object is to provide a method for making this compound. Other objects will become apparent from a consideration of the following description and example.

The 5-[3-(2,4-ditertiaryamylphenoxyacetoxy)benzylidene]-3-phenyl-2-phenylimino-4-thiazolidone of our invention can be prepared by condensing together 5-(3-hydroxybenzylidene)-3-phenyl-2-phenylimino-4-thiazolidone and 2,4-ditertiaryamylphenoxyacetyl chloride. The condensations can be accelerated by heating, although temperatures varying from room temperature to the reflux temperature of the reaction mixture can be employed. An inert diluent, e. g. benzene, cyclohexane, n-hexane, toluene, the xylenes, etc. can be used, if desired. The condensation can be carried out in the presence of a basic condensing agent, such as the organic tertiary amines, e. g. pyridine, the picolines, the collidines, triethylamine, etc. The following example will illustrate this method of preparation.

Example.—5 - [3 - (2,4 - ditertiaryamylphenoxyacetoxy)-benzylidene]-3-phenyl-2-phenylimino-4-thiazolidone

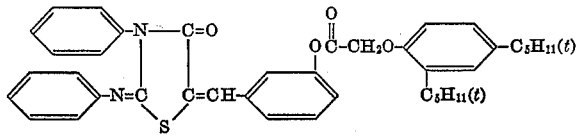

75 g. of 5-(3-hydroxybenzylidene)-3-phenyl-2-phenylimino-4-thiazolidone in 250 ml. of benzene was treated with 65 g. of 2,4-ditertiaryamylphenoxyacetyl chloride in 100 ml. of benzene, then 40 ml. of pyridine were added. The reaction mixture was then heated under reflux for two hours, washed first with water and then dilute sodium carbonate solution and dried. The benzene was removed by vacuum distillation and the residue triturated with ligroin. The crystalline solid which remained was recrystallized from ethyl alcohol (95%) to give 76 g. of white crystalline solid. This was the desired compound and it had a melting point of 133–5° C.

The 5-[3-(2,4-ditertiaryamylphenoxyacetoxy)benzylidene] - 3 - phenyl - 2 - phenylimino - 4 - thiazolidone obtained according to our invention is useful in preparing ultraviolet filtering layers for photographic elements as described in Sawdey U. S. application Serial No. 419,239, filed on even date herewith. The new compound of our invention is also useful in photographic afterbaths, or in lacquers or glazes in protective sleeves. It is also useful in suntan lotions or in wrapping paper, where it is desired to secure protection against the harmful effects of ultraviolet radiation.

The 5 - (3 - hydroxybenzylidene) - 3-phenyl-2-phenylimino-4-thiazolidone used in the above example can be obtained according to the method described in application Serial No. 317,864 mentioned above, condensing together 3-hydroxybenzaldehyde and 3-phenyl-2-phenylimino-4-thiazolidone. The acid chloride used in the above example can be prepared as described in Weissberger et al. U. S. Patent 2,511,231, issued June 13, 1950 (Column 9, lines 59–76 and column 10, lines 1–21).

What we claim as our invention and desire secured by Letters Patent of the United States is:

1. The compound represented by the following formula:

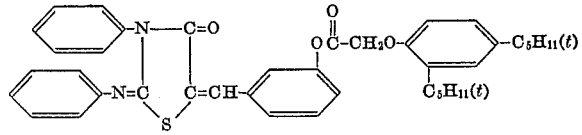

2. A process for preparing 5-[3-(2,4-ditertiaryamylphenoxyacetoxy)benzylidene] - 3 - phenyl-2-phenylimino-4-thiazolidone comprising intermixing 5-(3-hydroxybenzylidene) - 3 - phenyl - 2 - phenylimino - 4 - thiazolidone together with 2,4-ditertiaryamylphenoxyacetyl chloride.

3. A process as defined in claim 2 wherein the process is carried out in the presence of an organic tertiaryamine.

4. A process as defined in claim 3 wherein the organic tertiaryamine is pyridine.

No references cited.